Dec. 3, 1935.  J. STAEMPFLI  2,022,946
BOLT LOCK
Filed Jan. 10, 1935
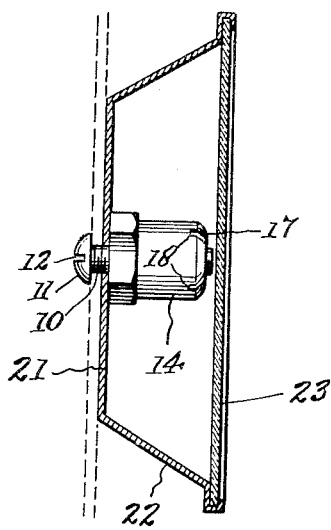
Fig. 1.
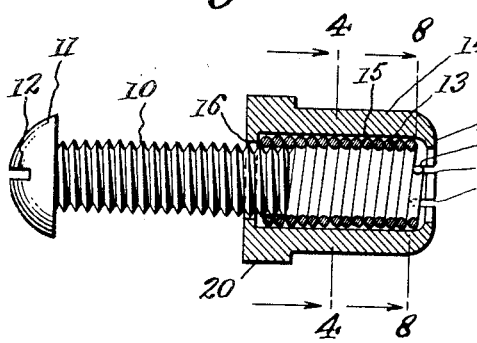
Fig. 2.
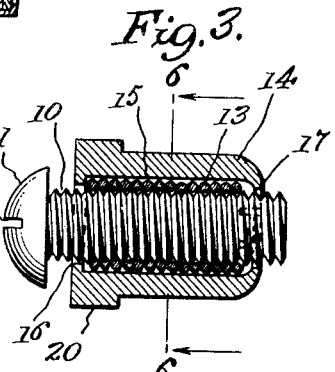
Fig. 3.
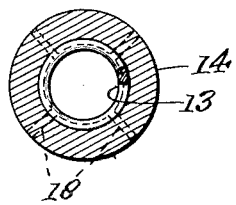
Fig. 4.
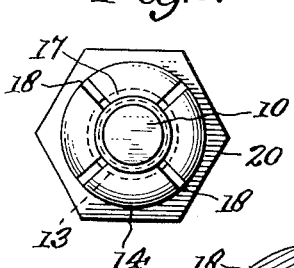
Fig. 5.
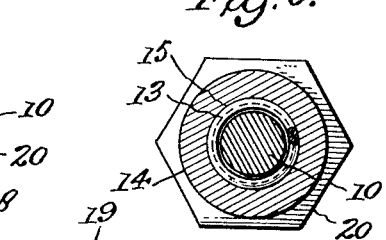
Fig. 6.
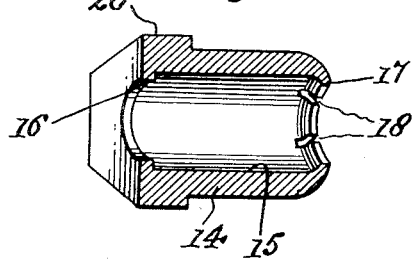
Fig. 7.
Fig. 8.
Inventor
Joseph Staempfli
By Wilkinson & Mawhinney
Attorneys.

Patented Dec. 3, 1935

2,022,946

UNITED STATES PATENT OFFICE 2,022,946

BOLT LOCK

Joseph Staempfli, New Orleans, La.

Application January 10, 1935, Serial No. 1,253

2 Claims. (Cl. 151—32)

The present invention relates to improvements in bolt locks, and has for an object to provide an improved construction of bolt lock which will effectually prevent the bolt from turning or being backed off from the locking device.

Another object of the invention is to provide an improved device of this kind in which such protection is afforded the locking device that access thereto cannot be had for the purpose of shearing off parts with a view to releasing the bolt.

A further object of the invention is to provide a device of this kind which will simulate a nut and will thus give rise to the impression that methods similar to the release of locked nuts may be resorted to, but which methods will be ineffectual to dislodge the improved device.

The invention is applicable to brake tags, license plate holders, and to many other uses where non-removable bolts are desired.

With the foregoing and other objects in view, the invention will be more fully described hereinafter, and will be more particularly pointed out in the claims appended hereto.

In the drawing, wherein like symbols refer to like or corresponding parts throughout the several views;

Figure 1 is a sectional view taken through a casing shown held in place by the improved bolt lock.

Figure 2 is a longitudinal section, taken on an enlarged scale, through the bolt and its locking device with the bolt in an initial position.

Figure 3 is a similar view showing the bolt as driven home.

Figure 4 is a cross section taken on the line 4—4 in Figure 2.

Figure 5 is an end view of the locking device.

Figure 6 is a cross section taken on the line 6—6 in Figure 3.

Figure 7 is a perspective view, shown partly in section and partly broken away, of the casing for the locking spring, and Figure 8 is a cross sectional view taken on the line 8—8 in Figure 2.

Referring more particularly to the drawing, 10 designates the threaded shank of a bolt having a head 11 with a cross cut 12, or other shaped head construction to receive a screw driver or wrench or other implement by which the bolt or the screw may be rotated to cause it to assume a fastening position.

The bolt is adapted to be screwed into a coil spring 13 contained within a casing 14. The casing itself is entirely devoid of threads and is made with a plain cylindrical wall 15, as shown in Figure 7, so that the coil spring 13 may turn freely within the casing 14, as hereinafter explained. Interiorly there projects into the cavity of the casing an annular shoulder 16, such shoulder being at the inner end of the casing and acting as an abutment for one end of the coil spring 13. This coil spring 13 is assembled with the casing 14 by sliding the same axially through the outer end of the casing 14 until the inner end of the spring strikes the abutment shoulder 16. In order to allow of the introduction of the coil spring 13 within the casing 14, the forward ends thereof will be originally produced in an expanded position. After the spring has been introduced, the end portions 17 of the casing 14 are hammered or pressed inwardly in a radial direction, which is permitted by the slot formation 18, thus preventing the escape of the coil spring 14 outwardly, but leaving an opening for the passage of the bolt 10. The slotted construction 18 also forms a projection interior of the casing 14 adjacent the outer terminal end 19 of the coil spring 13.

The casing 14 is provided with a hexagonal or other nut portion 20 which may take a wrench or other tool to hold the casing 14 against turning.

The convolutions of the coil spring 13 are preferably of substantially the same pitch as the pitch of the screw threaded shank of the bolt 10 whereby these threads will substantially mate.

In the use of the device, the bolt 10 is first introduced into the casing 14, as indicated in Figure 2, the threads of the bolt 10 being rotated into convolutions of the spring 13. When the bolt is screwed into the casing and into the coil spring, such coil spring 13 forms in effect a ratchet. There will be a tendency of the bolt 10 to carry the coil spring 13 around with it due to friction between the threads of the bolt and the convolutions of the spring, but the leading end 19 of the coil spring, as shown in Figure 8, will catch upon a projection, such for instance as one of the edges of a slot 18, and hold the coil spring while the bolt is rotated therethrough for instance to the position shown in Figure 3, which position we will assume is necessary to secure a close approach of the bolt head 11 and the adjacent end of the casing 14, whereby to clamp therebetween the base wall 21 of a casing such as shown in Figure 1.

This may be a pressed metal cap or casing 22 having a glass or celluloid cover 23. The construction is such as is usually encountered in brake tags, or license plate holders, etc.

Whenever an attempt is made to unscrew the bolt 10, the coil spring 13 will turn with the bolt which prevents it from being loosened regardless of the amount of pressure, friction or vibration which might be placed on the so-called nut or casing 14. In screwing the bolt 10 through the coil spring in the first instance, the movement is a clockwise movement as looked at in Figure 8. The leading edge 19 of the coil spring will move in the direction of the arrow A causing it to catch in a projection and arrest movement of the coil spring and permit threading of the bolt 10 into such coil spring 13. However, when attempt is made to back off the bolt 10, the motion will be in the direction of arrow B, which causes the end of the coil spring 19 to be a trailing end which cannot catch in projection and thereby the coil spring 13 will turn around loosely within the casing 14 and the bolt will not be turned out of the convolutions of the coil spring 13. The bolt together with the coil spring 13 and its casing 14 form a locked combination effectually preventing the separation of the parts with or without a wrench unless the casing is completely destroyed by cutting it entirely off.

Even if the bolt is tightened to the point where the threads are stripped, the bolt cannot be removed. The coil spring 13 is entirely enclosed which makes it impossible to remove same by cutting the end of the spring or by shearing the spring off. Neither end of the coil spring 13 is exposed.

It is obvious that various changes and modifications may be made in the details of construction and design of the above specifically described embodiment of this invention without departing from the spirit thereof, such changes and modifications being restricted only by the scope of the following claims:

What is claimed is:—

1. The combination with a threaded bolt of a casing having a plain internal cylindrical wall of substantially greater diameter than the diameter of the bolt and adapted to embrace at least a portion of such bolt, said casing having at its inner end an abutment projecting inwardly of said plain wall, the outer portion of the casing being slotted, a coil spring contained floatingly within said casing and limited in one direction of axial movement by said abutment, said coil spring having a pitch to mate with the threads on the bolt, the outer slotted portion of said casing projecting inwardly of the said plain wall and having a projection in the path of the adjacent end of the spring whereby when the spring is turned in one direction so that its end becomes leading such leading end will engage the projection and hold the coil spring against movement while the bolt is screwed therein.

2. The combination with a threaded bolt, of a casing having a plain internal cylindrical wall of substantially greater diameter than the diameter of the bolt and adapted to embrace at least a portion of such bolt, said casing having at its inner and outer end portions abutments, a coil spring within the casing confined at its ends against substantial axial movement by said abutments and having a pitch substantially mating with the threads of the bolt, whereby the bolt may be screwed into the coil spring, said casing having a projection therein projecting into the path of rotation of one end portion of the coil spring and adapted to engage and arrest such end of the coil spring only when such coil spring tends to rotate in a direction of screwing of the bolt into the coil spring whereby the bolt may be screwed home a desired distance into the spring, said projection not interfering with the free rotation of the coil spring relatively to the casing when either the bolt or the casing are rotated in a direction which would screw the bolt out of the coil spring.

JOSEPH STAEMPFLI.